United States Patent
Choi et al.

(10) Patent No.: US 7,421,558 B2
(45) Date of Patent: Sep. 2, 2008

(54) SYSTEM CONTROLLING INTERFACE TIMING IN MEMORY MODULE AND RELATED METHOD

(75) Inventors: Hee-joo Choi, Suwon-si (KR); Joon-hee Lee, Yongin-si (KR); Dong-jun Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 330 days.

(21) Appl. No.: 11/256,108

(22) Filed: Oct. 24, 2005

(65) Prior Publication Data

US 2006/0090054 A1    Apr. 27, 2006

(30) Foreign Application Priority Data

Oct. 25, 2004   (KR) ................. 10-2004-0085381

(51) Int. Cl.
*G06F 12/06* (2006.01)

(52) U.S. Cl. .................. 711/167; 711/154; 710/6; 710/305; 713/400; 713/500

(58) Field of Classification Search ............... 711/167, 711/100, 154, 170; 365/200; 713/320, 500, 713/400, 600; 712/6, 305, 310
See application file for complete search history.

(56) References Cited

U.S. PATENT DOCUMENTS

| | | |
|---|---|---|
| 6,535,411 B2 | 3/2003 | Jolin et al. |
| 2001/0003198 A1 | 6/2001 | Wu |
| 2002/0144173 A1 | 10/2002 | Jeddeloh |
| 2003/0105932 A1* | 6/2003 | David et al. ............ 711/167 |
| 2003/0156473 A1* | 8/2003 | Sinclair et al. .......... 365/200 |
| 2003/0231537 A1* | 12/2003 | Stark ..................... 365/201 |
| 2005/0190193 A1* | 9/2005 | Freker et al. ............ 345/534 |

* cited by examiner

*Primary Examiner*—Pierre-Michel Bataille
(74) *Attorney, Agent, or Firm*—Volentine & Whitt, PLLC (57) ABSTRACT

A memory system for controlling interface timing in a memory module and a related timing control method are disclosed. The memory system comprises a memory module having a memory module controller configured to control interface timing of a plurality of memory devices in accordance with memory information and memory signal information. The memory information includes memory initialization information and interface timing information for the plurality of memory devices.

10 Claims, 10 Drawing Sheets

SYSTEM CONTROLLING INTERFACE TIMING IN MEMORY MODULE AND RELATED METHOD

BACKGROUND OF THE INVENTION

1. Field of the Invention

The present invention relates to a memory system including a memory module having a plurality of memory devices. More particularly, the present invention relates to a memory system capable of controlling interface timing for the memory devices by storing timing control information in a memory information storage unit.

This application claims the benefit of Korean Patent Application No. 10-2004-0085381, filed on Oct. 25, 2004, the disclosure of which is incorporated by reference herein in its entirety.

2. Description of the Related Art

The performance of computer systems has improved over time, and along with this improvement has come changes in the design of memory systems. Most memory systems now include a plurality of memory modules, and most current memory modules include a plurality of memory devices. Conventional memory modules include Single In-line Memory Modules (SIMMs), Dual In-line Memory Modules (DIMMs), and Fully Buffered DIMMs (FBDIMMs).

A SIMM is a small printed circuit board on which at least one Random Access Memory (RAM), such as a Dynamic Random Access Memory (DRAM) or a Synchronous Dynamic Random Access Memory (SDRAM), chip is installed. The SIMM also includes pins that facilitate connection to a motherboard. A DIMM, which usually includes two SIMMs, also includes a plurality of RAM chips attached to a small printed circuit board and motherboard connection pins.

Conventional SIMMs typically read/write 32-bit wide data words and are thus often used in systems having 72 pin connectors. DIMMs typically read/write 64-bit wide data words and are used in systems having 168 pin connectors. Contemporary SDRAMs read/write 64-bit wide data words, so an SDRAM requires at least two SIMMs or a DIMM.

Conventional DIMMs are controlled by a memory controller external to the DIMM. In an exemplary system, a northbridge connected to a CPU acts as the memory controller. However, use of an external controller reduces the operation speed and limits performance of the DIMM.

An FBDIMM is a memory module developed to solve this problem. The FBDIMM has a controller installed in the memory module and adapted to control the operation of the memory module, including perhaps an Advanced Memory Buffer (AMB).

Since a plurality of memory devices are used in a memory module (particularly a DIMM or FBDIMM), and a plurality of memory modules are used in a memory system, it is necessary to initialize and set the timing of the memory modules, and the memory devices in each memory module, in order to properly read/write data to/from the memory modules in a memory system.

Conventionally, memory information, which includes memory initialization and timing information, is stored in a memory information storage unit such as a Serial Presence Detect (SPD) associated with a memory module. A memory controller will collect memory information stored in the SPD, and will then use the collected memory information to initialize and set the timing of the memory module when the memory controller initializes or tests the memory module.

The SPD, which stores memory information regarding the memory module and/or the memory devices, is located in the memory module. Information stored in the SPD includes all information regarding the memory module, such as speed, voltage, row/column address, refresh rate, AC parameters (clock cycle time (tCC), CAS delay time (tCL), RAS-CAS delay time (tRCD), row precharge time (tRP), etc.), and the producer of the memory module and/or memory devices.

Figure 1:
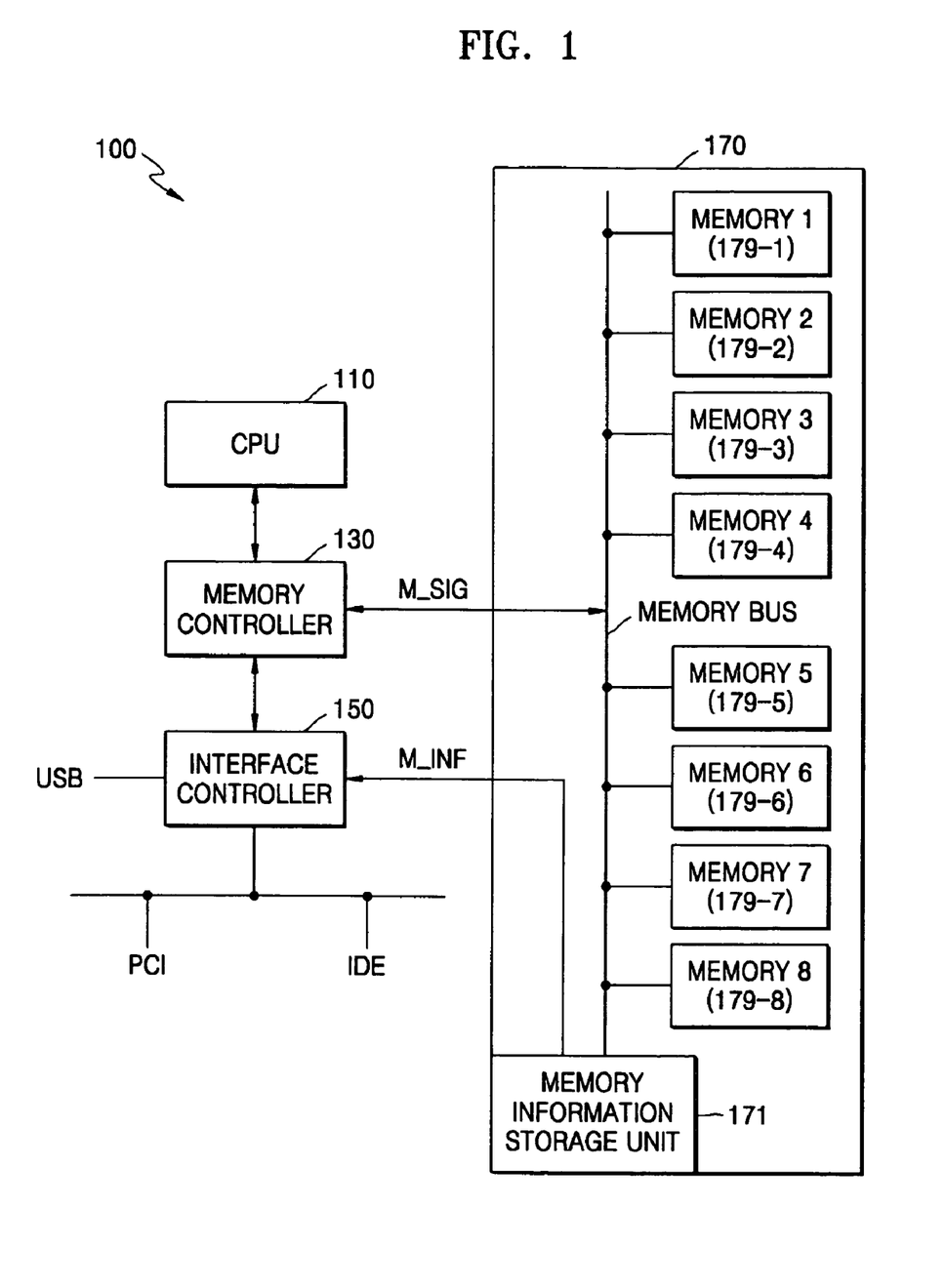
FIG. 1 is a block diagram of a conventional memory system including a memory module.

FIG. 1 is a block diagram of an exemplary memory system including a memory module.

Memory system 100 shown in FIG. 1 includes CPU 110, memory controller 130, interface controller 150, and memory module 170. Interface controller 150 reads memory information M_INF stored in memory information storage unit 171 located in memory module 170 and then provides memory information M_INF to memory controller 130. Memory controller 130 stores memory information M_INF received from interface controller 150 in an internal memory timing register, initializes memory module 170 using memory information M_INF, and then sets the timing of the memory module. Thereafter, memory controller 130 provides memory signal M_SIG, including clock signal CLK, command signal CMD, address signal ADD, data strobe signal DQS, etc., to memory devices 179-1 through 179-8.

In a computer system, memory controller 130 can be implemented in a northbridge (NB), which connects the memory module, an Accelerated Graphics Port (AGP), and Peripheral Component Interconnect (PCI) buses to a CPU. Interface controller 150 can be implemented in a southbridge (SB) for controlling Integrated Drive Electronics (IDE) buses, Universal Serial Buses (USB's), plug and play support, a keyboard/mouse controller, power management, etc.

In the computer system, if the southbridge reads memory information from memory information storage unit 171 and requests an interrupt to the northbridge, the northbridge stops its current processing operation in response to the interrupt request, receives the memory information from the southbridge, stores the received memory information in its internal memory timing register, and then resumes its previous operation.

However, since memory module 170 is initialized and the memory timing is set using the memory timing information stored in external memory controller 130 in conventional memory system 100, a relatively long time is required to initialize the memory module, and controlling the interface timing of the memory device is difficult.

Since the recent development of various memory devices, a memory module must be able to use various memory devices, each with different interface timings such as set-up times and hold times, which makes controlling the memory module more difficult. Therefore, it is necessary to appropriately control different interface timings to prevent errors in a memory system.

SUMMARY OF THE INVENTION

In one embodiment, the invention provides a memory system comprising a memory module comprising a plurality of memory devices configured to store data, and a memory module controller configured to control interface timing associated with the plurality of memory devices in accordance with memory information and memory signal information, an interface controller connecting the memory module to at least one Input/Output (I/O) device and adapted to receive the memory information from the memory module, and a memory controller adapted to receive the memory information from the interface controller and write the memory information and the memory signal information to the memory module, wherein the memory information comprises memory initialization information and interface timing information for the plurality of memory devices.

In another embodiment, the invention provides a memory system comprising a memory module comprising a plurality of memory devices configured to store data, a memory information storage unit configured to store memory information and provide the memory information to a memory module controller, and the memory module controller configured to control interface timing associated with the plurality of memory devices in accordance with the memory information and memory signal information, an interface controller configured to control connections between the memory module and at least one I/O device, and a memory controller adapted to write the memory signal information to the memory module, wherein the memory information comprises memory initialization information and interface timing information for the plurality of memory devices.

In yet another embodiment, the invention provides a method for controlling interface timing associated with a plurality of memory devices installed in a memory module, the memory module comprising a memory information storage unit and a memory module controller, and the method comprising providing memory information stored in the memory information storage unit to an interface controller, providing the memory information to a memory controller, providing the memory information and memory signal information to the memory module controller, generating a memory signal in response to the memory signal information, controlling the timing of the memory signal using the memory information and the memory signal information, wherein the memory information comprises memory initialization information and interface timing information for the plurality of memory devices, and providing the memory signal to the plurality of memory devices.

In still another embodiment, the invention provides method for controlling interface timing associated with a plurality of memory devices installed in a memory module, the memory module comprising a memory information storage unit and a memory module controller, and the method comprising providing memory information stored in the memory information storage unit to the memory module controller, receiving memory signal information provided by a memory controller, generating a memory signal in response to the memory signal information, controlling the timing of the memory signal using the memory information and the memory signal information, wherein the memory information comprises memory initialization information and interface timing information for the plurality of memory devices, and providing the memory signal to the plurality of memory devices.

BRIEF DESCRIPTION OF THE DRAWINGS

Hereinafter, exemplary embodiments of the invention will be described in some additional detail with reference to the drawings. Like reference numbers refer to like components throughout the drawings. In the drawings.

DESCRIPTION OF THE EXEMPLARY EMBODIMENTS

Figure 2:
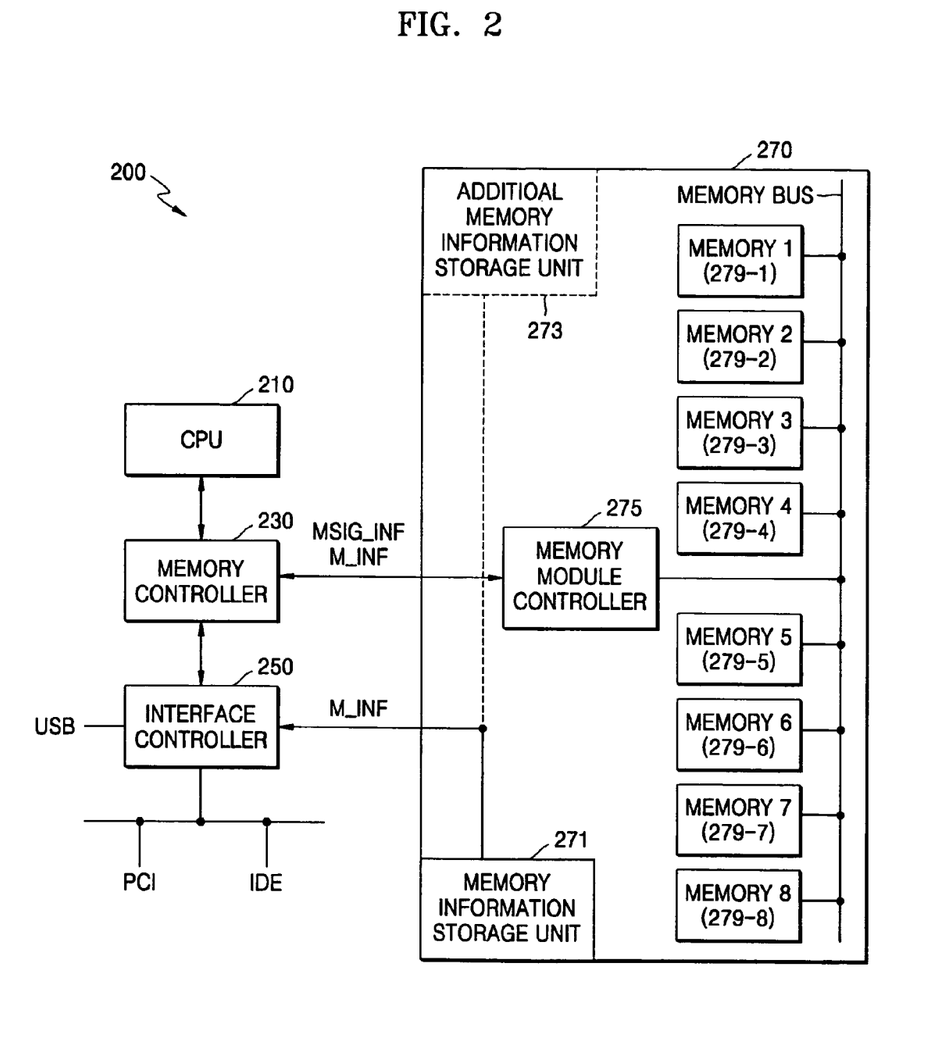
FIG. 2 is a block diagram of a memory system in accordance with an embodiment of the invention.

FIG. 2 is a block diagram of memory system 200 according to an embodiment of the invention.

Memory system 200 includes memory module 270, memory controller 230, and interface controller 250. Interface controller 250 receives memory information M_INF from memory module 270 where it was stored, and then provides memory information M_INF to memory controller 230. Memory controller 230 provides memory information M_INF and memory signal information MSIG_INF to memory module 270. Instead of a conventional parallel method, a packet-type serial method is used to provide data from memory controller 230 to memory module 270.

Memory information M_INF includes memory initialization information and interface timing information of a memory device for controlling the timing of clock signal CLK, command signal CMD, address signal ADD, data strobe signal DQS, etc.

Like the conventional technique shown in FIG. 1, interface controller 250 and memory controller 230, according to the invention, can be implemented in a southbridge and a northbridge, respectively, in a computer system. In this case, the southbridge reads memory information M_INF from memory module 270 and then requests an interrupt for providing memory information M_INF to the northbridge. The northbridge stops its current processing operation in response to the interrupt request from the southbridge, and provides memory information M_INF and memory signal information MSIG_INF to memory module 270.

Memory module 270 includes memory devices 279-1 through 279-8, memory module controller 275, and memory information storage unit 271. Memory module 270 may further include additional memory information storage unit 273.

In memory system 200, memory module 270 may be a DIMM but is preferably a FBDIMM. Each of the memory devices 279-1 through 279-8 may be a RAM, but is preferably an SDRAM. Memory information storage unit 271 and memory module controller 275 are preferably an SPD and an AMB, respectively. However, the present invention is not limited to these devices.

In contrast to the conventional technique, memory information storage unit 271 stores interface timing information for controlling interface timing of memory devices 279-1 through 279-8 as part of memory information M_INF, in addition to the conventional memory information.

The interface timing information can be stored in an unused area of memory information storage unit 271 where other parts of memory information M_INF is not stored. Alternatively, in another embodiment of the invention, the interface timing information can be stored in additional memory information storage unit 273.

Memory information M_INF is provided to memory module controller 275 through interface controller 250 and memory storage unit 230. Memory module controller 275 sets an internal memory timing register and initializes memory module 270 in accordance with received memory information M_INF. Also, memory module controller 275 generates memory signal M_SIG using received memory signal information MSIG_INF.

After generating memory signal M SIG, memory module controller 275 controls the timing of an internal signal (memory signal M_SIG) of memory module 270 using the interface timing information. Memory signal M_SIG is then provided to memory devices 279-1 through 279-8 in parallel.

Figure 3:
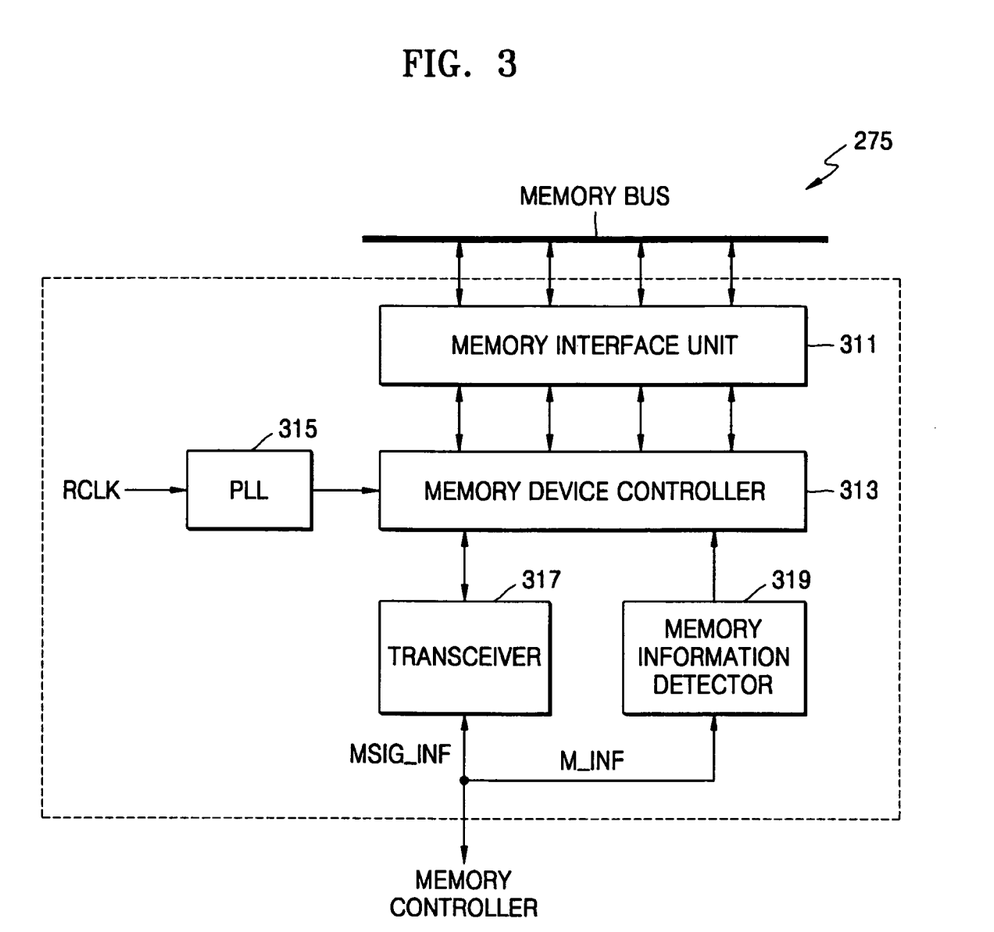
FIG. 3 is a block diagram of a memory module controller in FIG. 2.

FIG. 3 is a block diagram of memory module controller 275 of FIG. 2.

Memory module controller 275 includes memory interface unit 311, memory device controller 313, phase locked loop (PLL) 315, transceiver 317, and memory information detector 319.

Transceiver 317 receives and transmits signals between memory controller 230 and memory module 270. Signals received and transmitted between memory controller 230 and memory module 270 include all signals regarding memory reading and writing, such as memory signal information MSIG_INF for generating clock signal CLK, command signal CMD, address signal ADD, and data strobe signal DQS, as well as memory information M_INF.

Memory information detector 319 detects memory information M_INF of signals received from memory controller 230, and provides memory information M_INF to memory device controller 313. In response to memory signal information MSIG_INF received from memory controller 230 and detected memory information M_INF, memory device controller 313 controls memory signal M_SIG that will be provided to memory devices 279-1 through 279-8.

In more detail, memory device controller 313 sets its internal memory timing register and initializes memory module 270 in accordance with memory information M_INF, and generates memory signal M_SIG for writing or reading in response to memory signal information MSIG_INF. Also, memory device controller 313 controls the timing of memory signal M_SIG using the interface timing information.

Memory interface unit 311 provides communication of memory signal M_SIG between memory module controller 275 and memory devices 279-1 through 279-8 through a memory bus. Phase locked loop (PLL) 315 generates clock signal CLK to be used by memory module 270, using system clock signal RCLK.

Figure 4:
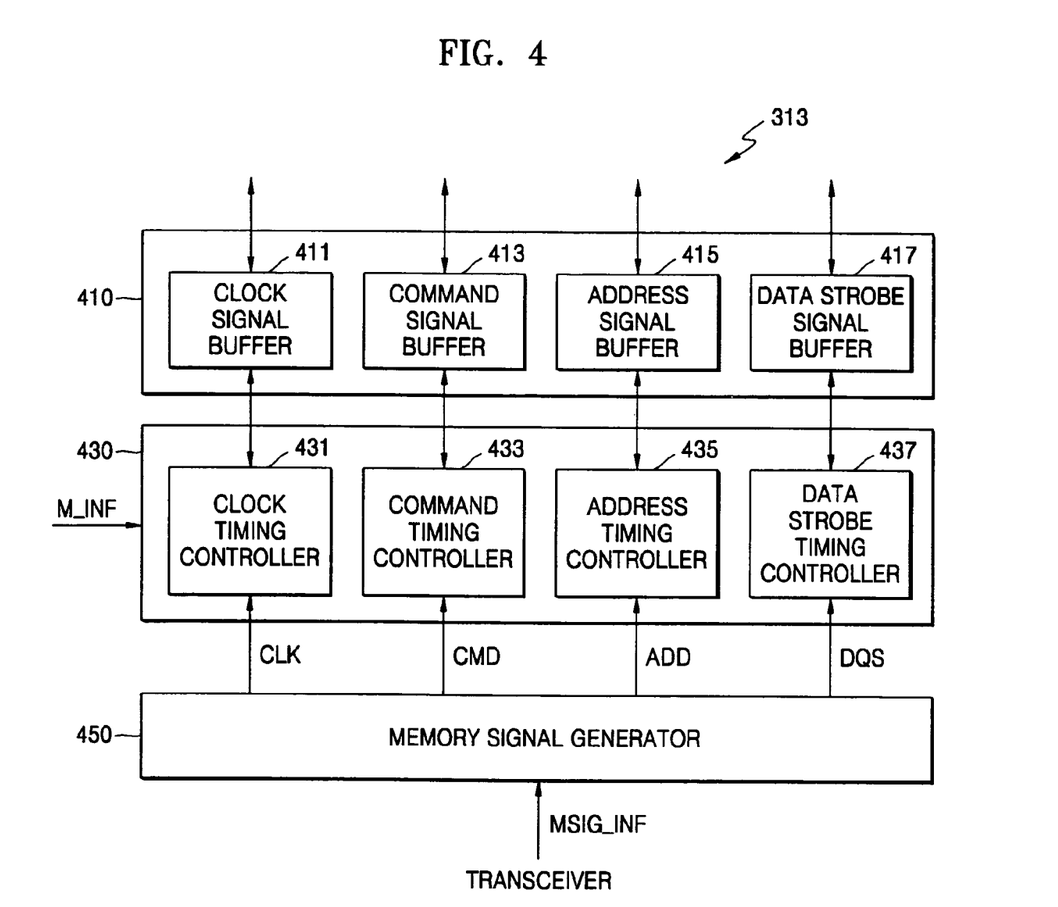
FIG. 4 is a block diagram of a memory device controller in FIG. 3.

FIG. 4 is a block diagram of the memory device controller 313 of FIG. 3.

Memory device controller 313 includes memory signal generator 450, memory timing controller 430, and memory signal buffer unit 410. Using memory signal information MSIG_INF, memory signal generator 450 generates memory signal M_SIG, which will be provided to memory devices 279-1 through 279-8. Memory signal M_SIG includes clock signal CLK, command signal CMD, address signal ADD, and data strobe signal DQS.

Memory timing controller 430 controls the timing of memory signal M_SIG using memory information M_INF. Memory signal buffer unit 410 buffers memory signal M SIG and controls the timing of memory signal M_SIG according to timing controller information provided by memory timing controller 430.

Memory timing controller 430 includes clock signal timing controller 431, command signal timing controller 433, address timing controller 435, and data strobe timing controller 437.

Clock signal timing controller 431 controls the timing of clock signal CLK generated by phase locked loop 315, using clock signal timing information included in memory information M_INF. Command signal timing controller 433 controls the timing of command signal CMD using command signal timing information included in memory information M_INF. Address timing controller 435 controls the timing of address signal ADD using address signal timing information included in memory information M_INF. Data strobe timing controller 437 controls the timing of data strobe signal DQS using data strobe signal timing information included in memory information M_INF.

Memory signal buffer unit 410 includes clock signal buffer 411, command signal buffer 413, address signal buffer 415, and data strobe buffer 417. Clock signal buffer 411 controls the timing of clock signal CLK according to clock timing controller information provided by clock timing controller 431, and provides clock signal CLK to memory interface unit 311. Command signal buffer 413 controls the timing of command signal CMD according to command timing controller information provided by command timing controller 433, and provides command signal CMD to memory interface unit 311. Address signal buffer 415 controls the timing of address signal ADD according to address timing controller information provided by address timing controller 435, and provides address signal ADD to memory interface unit 311. Data strobe buffer 417 controls the timing of data strobe signal DQS according to data strobe timing controller information provided by data strobe timing controller 437, and provides data strobe signal DQS to memory interface unit 311.

Figure 5:
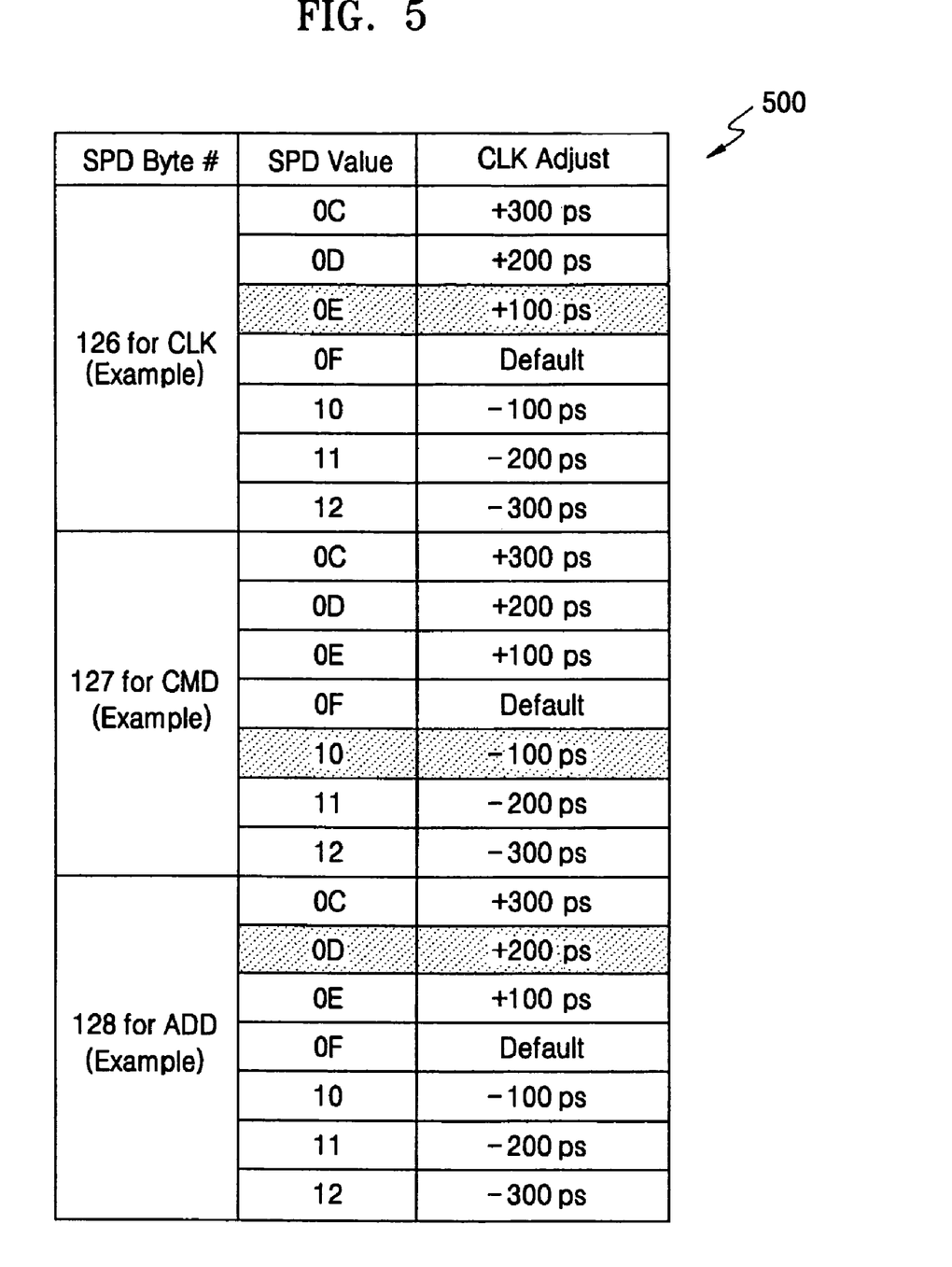
FIG. 5 shows an example of interface timing information.

FIG. 5 shows an example of the interface timing information.

Interface timing information 500 shown in FIG. 5 is stored in memory information storage unit 271. Interface timing information 500 includes interface timing information of clock signal CLK, command signal CMD, address signal ADD, and data strobe signal DQS (not shown).

Referring to FIG. 5, interface timing information of clock signal CLK, command signal CMD, and address signal ADD is stored in the 126th, 127th and 128th bytes of memory information storage unit 271, respectively. However, the storage locations of the interface timing information are not limited to the above-mentioned locations.

As shown in FIG. 5, if a value of "0F" stored in the 126th byte of memory information storage unit 271 is used as a default value, the interface timing of clock signal CLK is controlled according to values shown in the table of FIG. 5. For example, if the value stored in the 126th byte of the memory information storage unit 271 is "0E", then the interface timing of the clock signal CLK is adjusted by +100 pico-seconds (ps) so that the clock signal CLK leads a reference clock signal by 100 ps.

The interface timing of command signal CMD is controlled using a value of "0F" stored in the 127th byte of memory information storage unit 271, as a default value. For example, if the stored value is "10", the interface timing of the command signal CMD is adjusted by −100 ps so that the command signal CMD lags a reference command signal by 100 ps.

As shown in FIG. 5, if the value stored for controlling the interface timing of address signal ADD is "0D", the interface timing of address signal ADD is adjusted by +200 ps so that address signal ADD leads a reference address signal by 200 ps.

Figure 6:
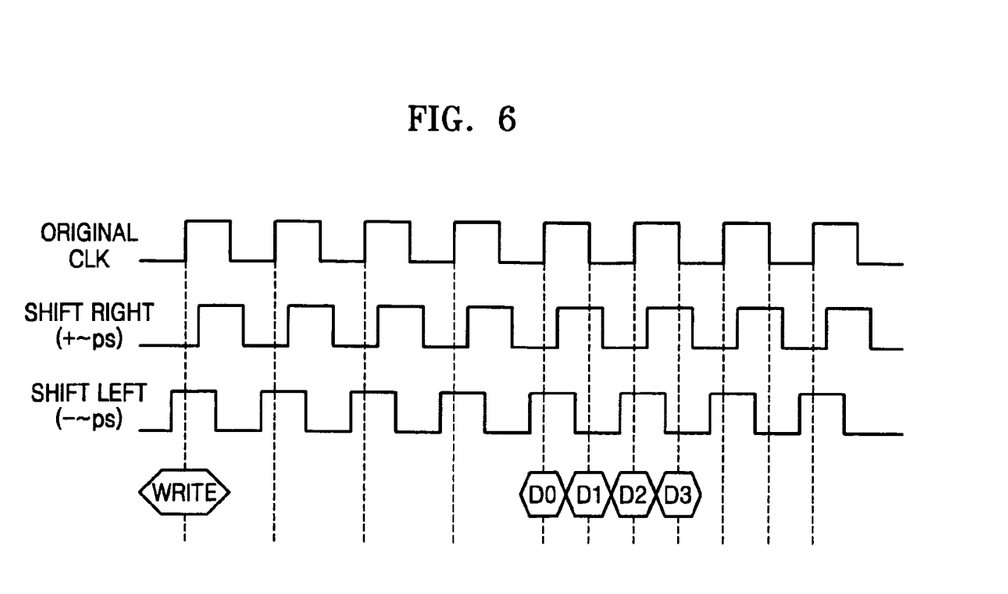
FIG. 6 is a timing diagram of a clock signal controlled in accordance with the interface timing information in FIG. 5.

FIG. 6 is a timing diagram of a clock signal controlled according to the interface timing information of FIG. 5.

The timing diagram of FIG. 6 shows reference clock signal ORIGINAL CLK, right-shifted clock signal SHIFT RIGHT, left-shifted clock signal SHIFT LEFT, write command WRITE, and data signals DO through D3.

The interface timing of clock signal CLK is controlled by using a value of "0F" stored in memory storage unit 271 as reference clock ORIGINAL CLOCK. That is, when a value smaller than "0F" is stored, clock signal CLK has a positive shift value and is right-shifted (SHIFT RIGHT). If a value larger than "0F" is stored, the clock signal CLK has a negative shift value and is left-shifted (SHIFT LEFT).

In FIG. 6, data signals DO through D3 and write command WRITE (a command signal) are set to be synchronized with the reference clock ORIGINAL CLK. However, the command signal and data signals DO through D3 cannot be synchronized with reference clock ORIGINAL CLK due to the initialization times of memory devices 279-1 through 279-8, signal delays, etc. In this case, by controlling the interface timing of clock signal CLK according to the invention, it is possible to synchronize the command signal and data signals DO through D3 with reference clock signal ORIGINAL CLK.

Figure 7:
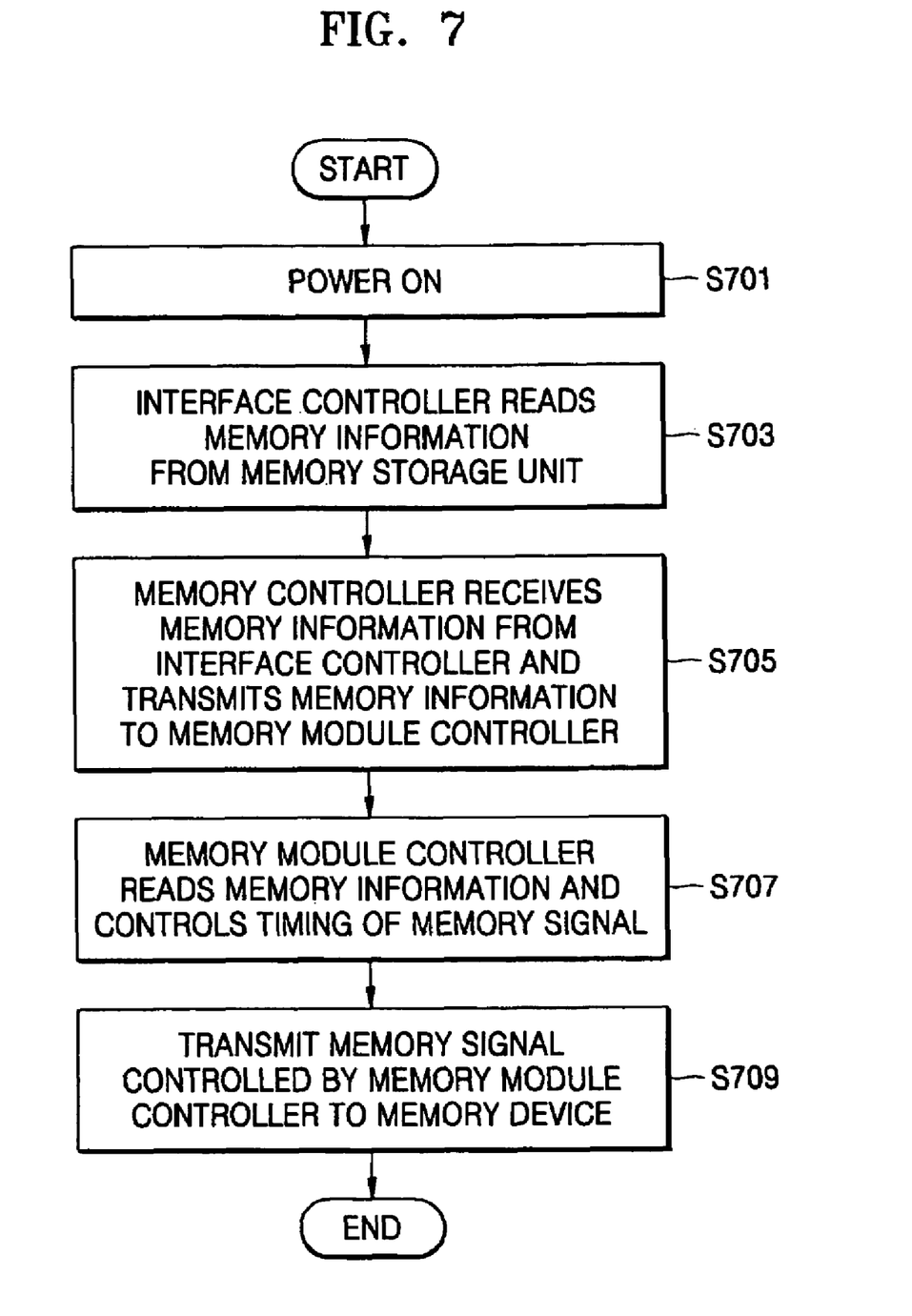
FIG. 7 is a flowchart illustrating an interface timing control method performed in a memory module, in accordance with an embodiment of the invention.

FIG. 7 is a flowchart illustrating an interface timing control method performed by the memory module 270, according to an embodiment of the invention.

Referring to FIG. 7, a method for controlling the timing of a memory signal provided to memory devices 279-1 through 279-8 is described below.

Once the power is turned on (operation S701), interface controller 250 reads memory information M_INF stored in memory information storage unit 271 (operation S703) and provides memory information M_INF to memory controller 230. Memory controller 230 receives memory information M_INF from interface controller 250 and provides memory information M_INF to memory module controller 275 (operation S705).

Memory module controller 275 reads memory information M_INF and generates memory signal M_SIG using memory information M_INF, and controls the timing of memory signal M SIG (operation S707). Memory module controller 275 transmits memory signal M_SIG to memory devices 279-1 through 279-8 (operation S709) through a memory bus.

The memory module controller 275 controls the interface timing of clock signal CLK, command signal CMD, address signal ADD, and data strobe signal DQS, using the interface timing information.

Figure 8:
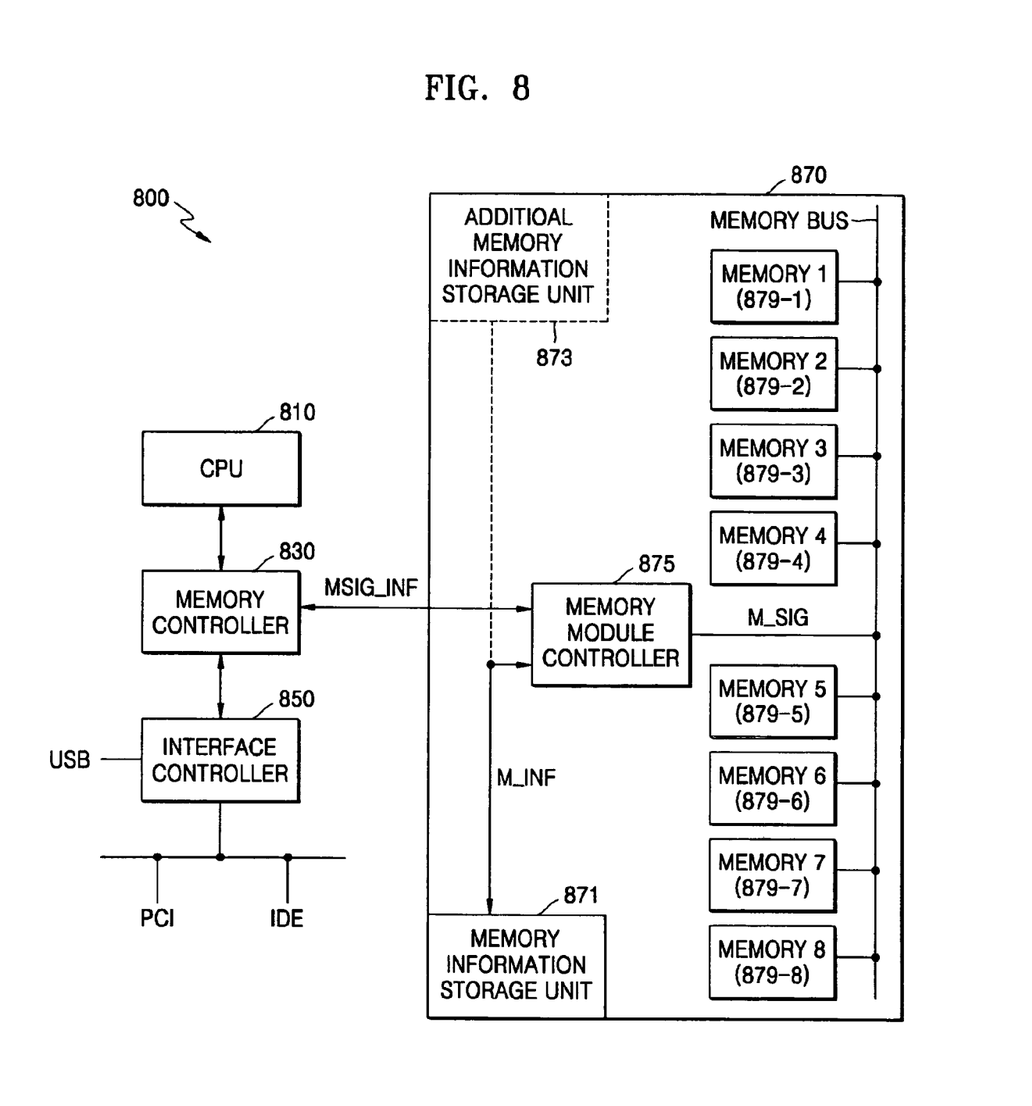
FIG. 8 is a block diagram of a memory system in accordance with another embodiment of the invention.

FIG. 8 is a block diagram of memory system 800 according to another embodiment of the invention.

Memory system 800 has the same configuration as memory system 200 shown in FIG. 2, except that memory module controller 875 directly receives memory information M_INF from memory information storage unit 871. In another embodiment of the invention, memory module controller 875 directly receives memory information M_INF from memory information storage unit 871 and/or additional memory storage unit 873.

Memory information M_INF stored in memory information storage unit 871 is provided directly to memory module controller 875, without a process in which memory module controller 875 receives memory information M_INF from memory information storage unit 871 through interface controller 850 and memory controller 830.

Figure 9:
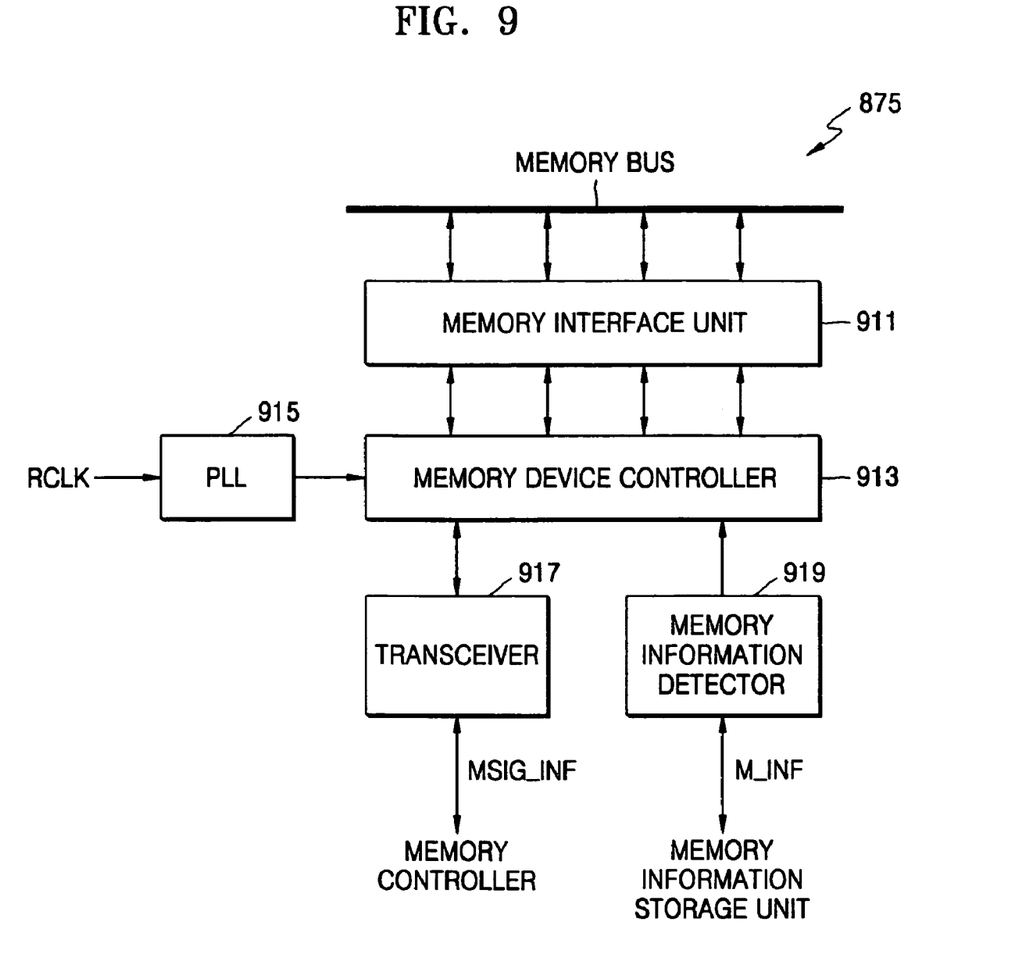
FIG. 9 is a block diagram of a memory module controller in FIG. 8.

FIG. 9 is a block diagram of memory module controller 875 of FIG. 8.

Memory module controller 875 has the same configuration as memory module controller 275 of FIG. 2, except that memory information detector 919 receives memory information M_INF from memory information storage unit 871, rather than from memory controller 830.

Thus, memory information M_INF is provided directly to memory module controller 875 by memory information storage unit 871, rather than being provided to memory module controller 875 through interface controller 850 and memory controller 830. Memory information detector 919 detects memory information M_INF provided by memory information storage unit 871 and provides memory information M_INF to memory device controller 913.

Memory device controller 913 controls the timing of memory signal M_SIG using memory information M_INF in the same manner described above with reference to FIG. 2, and accordingly, the configuration of memory device controller 913 is the same as that of memory device controller 313 of FIG. 3.

Figure 10:
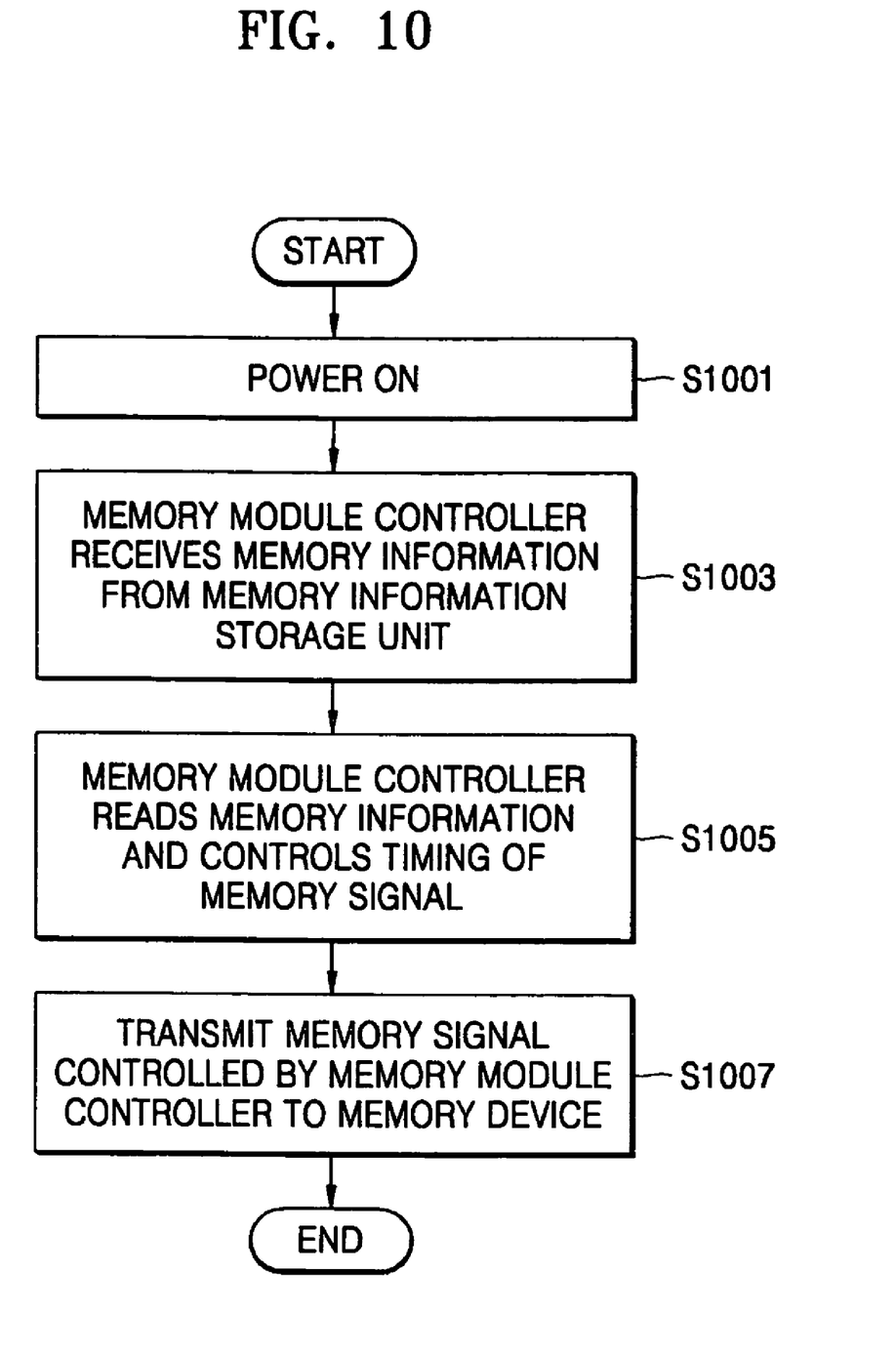
FIG. 10 is a flowchart illustrating an interface timing control method performed in a memory device, in accordance with an embodiment of the invention.

FIG. 10 is a flowchart illustrating an interface timing control method performed by memory device 800.

Referring to FIG. 10, when power is turned on (operation S1001), memory module controller 875 receives memory information M_INF from memory information storage unit 871 (operation S1003). Memory module controller 875 controls the timing of memory signal M_SIG using memory information M_INF (operation S1005), and transmits memory signal M_SIG to memory devices 879-1 through 879-8 (operation S1007) through a memory bus.

Memory module controller 875 controls the interface timing of clock signal CLK, command signal CMD, address signal ADD, and data strobe signal DQS, using the interface timing information in the same manner described above with reference to FIG. 4.

In accordance with the foregoing, by use of a method for controlling the timing of a memory signal and the interface timing of a memory device using memory interface timing information, it is possible to implement a memory system including various memory devices with different memory interface timing characteristics.

Also, according to the invention, by adjusting interface timing of the memory devices and adjusting the timing of memory devices which operate incorrectly, it is possible to facilitate debugging of the memory devices.

While the present invention has been particularly illustrated and described with reference to exemplary embodiments, those of ordinary skill in the art will understand that various changes in form and detail may be made to the embodiments without departing from the scope of the present invention as set forth in the following claims.

What is claimed is:

1. A memory system comprising:
   a memory module comprising; a plurality of memory devices configured to store data, a memory module controller configured to control interface timing associated with the plurality of memory devices in accordance with memory information and memory signal information, and a memory information storage unit configured to store the memory information and provide the memory information to the interface controller;
   an interface controller connecting the memory module to at least one Input/Output (I/O) device and adapted to receive the memory information from the memory module; and, a memory controller adapted to receive the memory information from the interface controller and write the memory information and the memory signal information to the memory module;

wherein the memory information comprises memory initialization information and interface timing information for the plurality of memory devices, and wherein the memory module controller comprises:

a transceiver configured to receive the memory signal information from the memory controller and provide the memory signal information to the memory module controller;

a memory information detector configured to detect the memory information provided by the memory controller and provide the memory information to the memory device controller;

a memory device controller configured to generate and control timing for a memory signal using the memory information and memory signal information;

a memory interface unit configured to connect the plurality of memory devices and the memory module controller;

wherein the memory device controller comprises:

a memory signal generator configured to generate the memory signal using the memory signal information;

a memory signal timing controller configured to control timing of the memory signal in relation to the memory information; and a memory signal buffer unit configured to buffer the memory signal and provide the memory signal to the memory interface unit.

2. The memory system of claim 1, wherein the memory signal timing controller comprises:

a clock signal timing controller configured to control the timing of a clock signal in response to the interface timing information;

a command signal timing controller configured to control the timing of a command signal in response to the interface timing information;

an address timing controller configured to control the timing of an address signal in response to the interface timing information; and, a data strobe timing controller configured to control the timing of a data strobe signal in response to the interface timing information.

3. The memory system of claim 2, wherein the interface timing information comprises clock signal timing information, command signal timing information, address signal timing information, and data strobe signal timing information.

4. The memory system of claim 3, wherein the memory signal buffer unit comprises:

a clock signal buffer configured to buffer the clock signal and supply the clock signal to the memory interface unit;

a command signal buffer configured to buffer the command signal and supply the command signal to the memory interface unit;

an address buffer configured to buffer the address signal and supply the address signal to the memory interface unit; and, a data strobe buffer configured to buffer the data strobe signal and supply the data strobe signal to the memory interface unit.

5. The memory system of claim 4, wherein the memory module further comprises an additional memory information storage unit configured to store interface timing information and provide the interface timing information to the interface controller.

6. A memory system comprising:

a memory module comprising a plurality of memory devices configured to store data, a memory information storage unit configured to store memory information and provide the memory information to a memory module controller, and the memory module controller configured to control interface timing associated with the plurality of memory devices in accordance with the memory information and memory signal information;

an interface controller configured to control connections between the memory module and at least one I/O device; and, a memory controller adapted to write the memory signal information to the memory module;

wherein the memory information comprises memory initialization information and interface timing information for the plurality of memory devices, wherein the memory module controller comprises:

a memory device controller configured to generate and control the timing of a memory signal using the memory information and the memory signal information;

a transceiver configured to receive the memory signal information from the memory controller and provide the memory signal information to the memory module controller;

a memory information detector configured to detect the memory information provided by the memory information storage unit and provide the memory information to the memory device controller; and a memory interface unit configured to connect the plurality of memory devices and the memory module controller, and wherein the memory device controller comprises:

a memory signal generator configured to generate the memory signal using the memory signal information;

a memory signal timing controller configured to control the timing of the memory signal based on the memory information; and a memory signal buffer unit configured to buffer the memory signal and provide the memory signal to the memory interface unit.

7. The memory system of claim 6, wherein the memory signal timing controller comprises:

a clock signal timing controller configured to control the timing of a clock signal in response to the interface timing information;

a command signal timing controller configured to control the timing of a command signal in response to the interface timing information;

an address timing controller configured to control the timing of an address signal in response to the interface timing information; and, a data strobe timing controller configured to control the timing of a data strobe signal in response to the interface timing information.

8. The memory system of claim 7, wherein the interface timing information comprises clock signal timing information, command signal timing information, address signal timing information, and data strobe signal timing information.

9. The memory system of claim 8, wherein the memory signal buffer unit comprises:
   a clock signal buffer configured to buffer the clock signal and supply the clock signal to the memory interface unit;
   a command signal buffer configured to buffer the command signal and supply the command signal to the memory interface unit;
   an address buffer configured to buffer the address signal and supply the address signal to the memory interface unit; and,
   a data strobe buffer configured to buffer the data strobe signal and supply the data strobe signal to the memory interface unit.

10. The memory system of claim 9, wherein the memory module further comprises an additional memory information storage unit configured to store interface timing information and further configured to provide interface timing information to the memory module controller.

* * * * *